United States Patent [19]

Somerville

[11] 4,242,678

[45] Dec. 30, 1980

[54] VARIABLE SIZE CHARACTER GENERATION USING NEIGHBORHOOD-DERIVED SHAPES

[75] Inventor: Daniel W. Somerville, Hingham, Mass.

[73] Assignee: Dennison Manufacturing Company, Framingham, Mass.

[21] Appl. No.: 925,024

[22] Filed: Jul. 17, 1978

[51] Int. Cl.³ .............................................. G06F 3/14
[52] U.S. Cl. .................................... 340/728; 340/731; 340/750
[58] Field of Search ............... 340/731, 728, 744, 748, 340/750; 178/30

[56] References Cited

U.S. PATENT DOCUMENTS

| | | | |
|---|---|---|---|
| 3,573,789 | 4/1971 | Sharp et al. ........................... | 340/728 |
| 3,893,100 | 7/1975 | Stein ..................................... | 340/731 |
| 4,063,232 | 12/1977 | Fernald .................................. | 178/30 |
| 4,129,860 | 12/1978 | Yonezawa et al. .................... | 178/30 |

*Primary Examiner*—Marshall M. Curtis
*Attorney, Agent, or Firm*—George E. Kersey; Arthur B. Moore

[57] ABSTRACT

Method and apparatus for expanding point matrix characters. For each member of a character set there is stored a basic character matrix defining the character in its lowest magnification. A shape code is assigned to each point of the basic character matrix based upon the configuration of blacks and whites in a neighborhood centering on the point. Quantized versions of the shape codes are used as templates for assigning expanded point arrays to each point in the basic matrix. The method is advantageously implemented by logic circuitry for a matrix printer or the like. The user may vary the aspect ratio of the expanded characters, and may design the shape codes to produce a pleasing character appearance.

20 Claims, 44 Drawing Figures

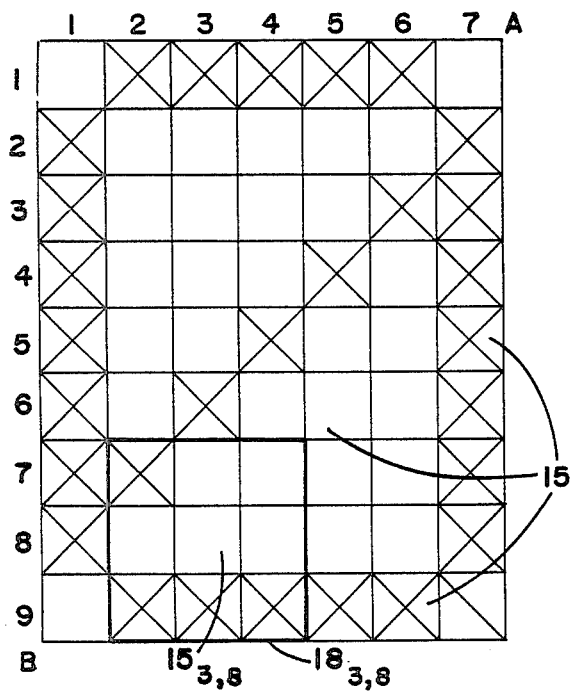
FIG. 1  10
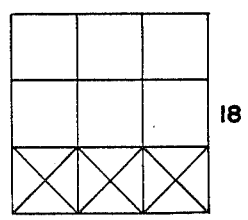
FIG. 2a  0000
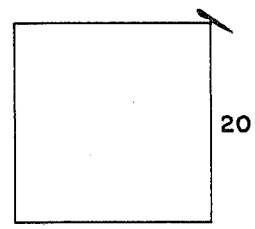
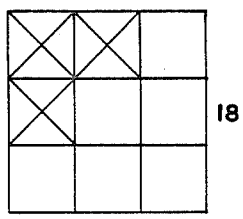 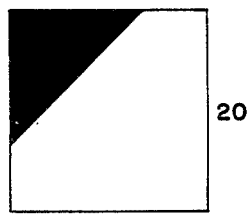
FIG. 2b  0001
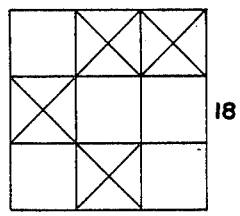
FIG. 2c  0010
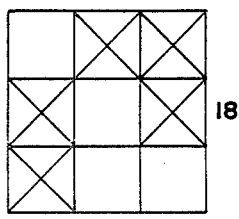 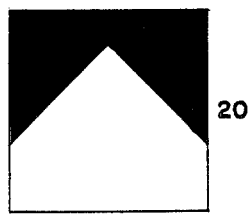
FIG. 2d  0011
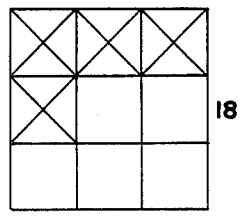
FIG. 2e  0100

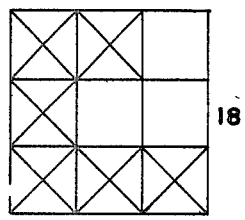 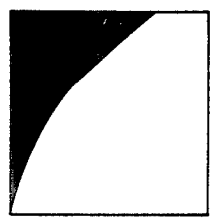 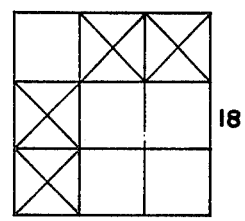 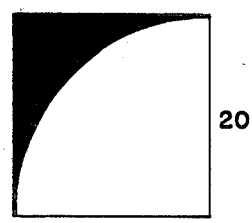
FIG. 2f  0101      FIG. 2g  0110
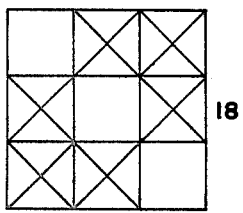 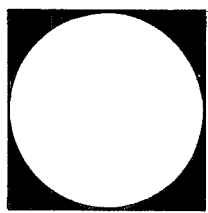 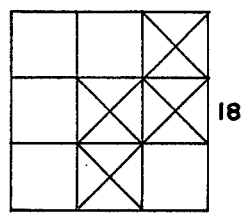 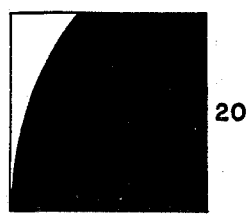
FIG. 2h  0111      FIG. 2i  1000
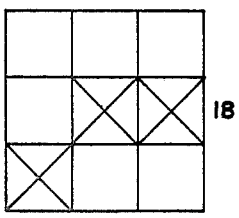 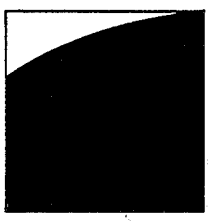 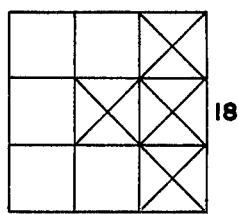 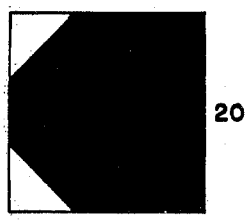
FIG. 2j  1001      FIG. 2k  1010
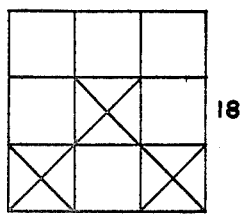 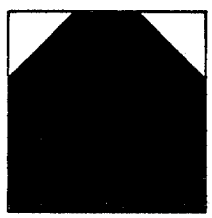 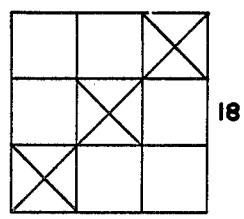 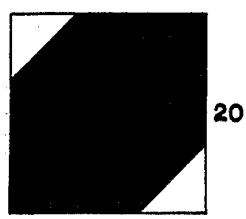
FIG. 2l  1011      FIG. 2m  1100

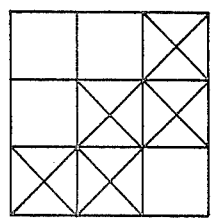 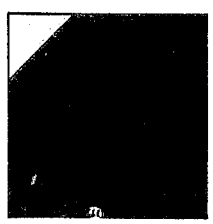 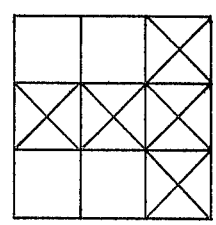 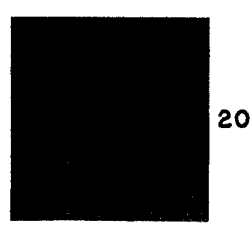
FIG. 2n  1101    FIG. 2o  1110
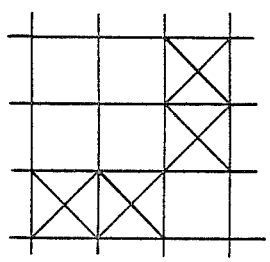 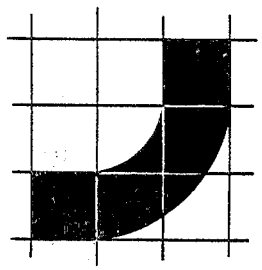 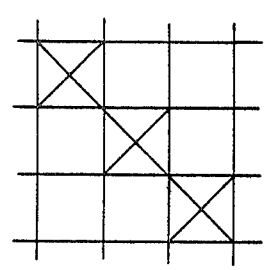 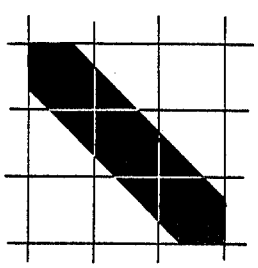
FIG. 3a   FIG. 3b    FIG. 4a   FIG. 4b
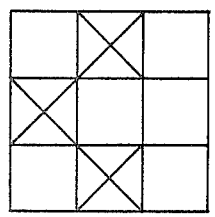 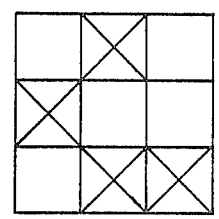 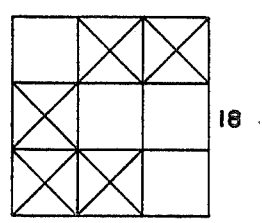
FIG. 5a    FIG. 5b    FIG. 5c
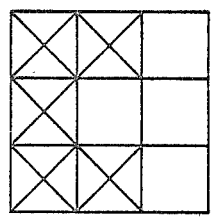 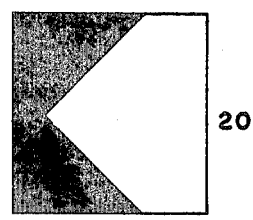
FIG. 5d    FIG. 5e

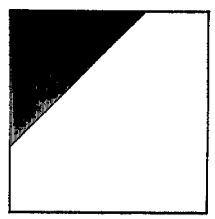
FIG. 6a   00
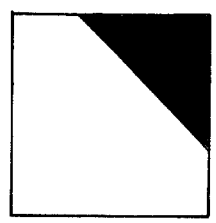
FIG. 6b   01
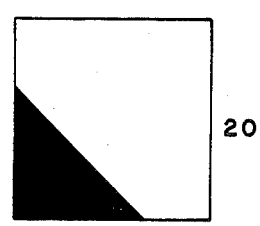
FIG. 6c   10
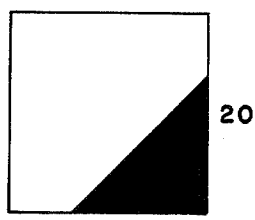
FIG. 6d   11
FIG. 7
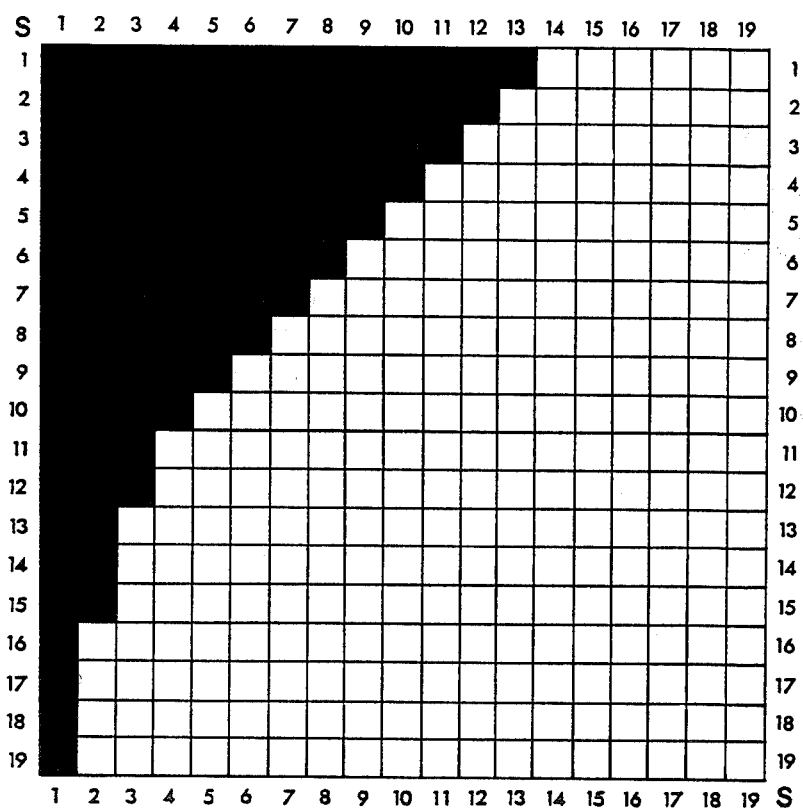
FIG. 8   25

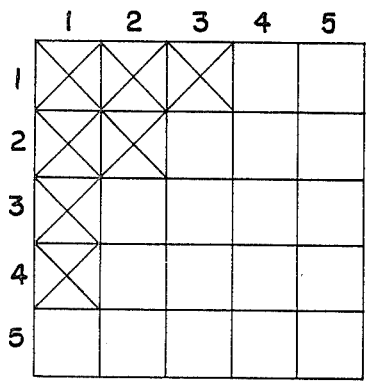
FIG. 10a    35
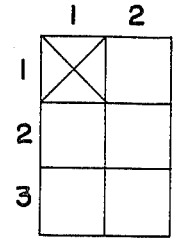
FIG. 10b    35
| | 1 | 2 | 3 | 4 | 5 | 6 | 7 | A |
|---|---|---|---|---|---|---|---|---|
| 1 | 000111 | 100100 | 111000 | 111000 | 111000 | 100101 | 000110 | |
| 2 | 100000 | 011000 | 000000 | 000000 | 000000 | 001001 | 100001 | |
| 3 | 111000 | 000000 | 000000 | 000000 | 000111 | 110000 | 111000 | |
| 4 | 111000 | 000000 | 000000 | 000111 | 110000 | 000100 | 111000 | |
| 5 | 111000 | 000000 | 000111 | 110000 | 000100 | 000000 | 111000 | |
| 6 | 111000 | 000111 | 110000 | 000100 | 000000 | 000000 | 111000 | |
| 7 | 111000 | 111000 | 000100 | 000000 | 000000 | 000000 | 111000 | |
| 8 | 100010 | 001000 | 000000 | 000000 | 000000 | 011011 | 100111 | |
| 9 | 000101 | 100110 | 111000 | 111000 | 111000 | 100111 | 000100 | |
B
40
FIG. 11

VARIABLE SIZE CHARACTER GENERATION USING NEIGHBORHOOD-DERIVED SHAPES

BACKGROUND OF THE INVENTION

The present invention relates to the generation of characters of variable size, and more particularly to variable size character generation in point matrix printing.

A widespread method of printing alphanumeric characters and other symbols is the matrix printing of small image components, usually dots. By employing minuscule dots in a sufficiently fine printing matrix, this method may be used to print relatively small characters (i.e. a small fraction of an inch in size) as well as characters with dimensions of one inch or more. A given printer, if it is to print characters of different sizes with minimal cost, should have a constant dot density. The same principles apply to other visual systems characterized by point matrices, such as CRT-matrix displays.

It is desirable in many applications that a matrix printer possess sufficient flexibility to allow changes in character size on a character to character basis. A typical example is the printing of information on merchandise tags; it may be desirable to use different sizes for price, size, product description, etc.

The simplest method of expanding a character while retaining a given point density is to multiply the number of image points in a given direction by the desired expansion factor. Thus, one could double the height of a character by replacing each dot with two vertically adjacent dots. This method, however, results in undesirably jagged edges, particularly in expanding diagonal lines.

A somewhat more advanced character expansion algorithm is disclosed by C. W. Stein in U.S. Pat. No. 3,893,100. This method employs a predetermined number of size independent component shapes which are combined with a signal indicative of character size to produce a point display of given display density. As disclosed, the size independent shape components are six in number, including open and closed squares as well as four different 45° triangles corresponding to the four possible orthogonal orientations. This method, while sound in its basic concept, suffers several practical limitations. It does not allow for different factors for vertical and horizontal expansion. The limited number of component shapes disclosed do not yield characters which are as pleasing in appearance as would be desirable for many purposes (for example, by allowing for curved edges). Finally, no algorithm is disclosed for deriving a suitable component shape to substitute for the single point in the unexpanded image. As a result, an increase in the number of component shapes would entail a large amount of storage to give this information for all the components of all the numbers of a character set. For example, with a character set of 100 members, printed on a 7×9 matrix, using a set of 60 component shapes (requiring six bit bytes), at least 6300 bytes would be involved. In a hardware embodiment, the higher cost of storage components typically outweighs the lower cost of components for analyzing the stored information.

Accordingly, it is a primary object of the invention to provide a character expansion method for point matrix characters. It is desirable that such a method produce characters which are visually pleasing. A related object is the availability of a wide range of character shapes, including curved edges.

It is another object of the invention that such an expansion algorithm be flexible. The algorithm should allow the possibility of different factors of expansion in the X and Y directions. In a hardware embodiment, the method should also allow the user to balance his requirements of image quality against the cost of implementing electronics.

A further object of the invention is the minimization of data storage requirements to implement the expansion algorithm. A related object is the formulation of an algorithm that will yield suitable component shapes for any expanded characters on the basis of already stored information.

SUMMARY OF THE INVENTION

In accomplishing the foregoing and related objects, the invention provides a method for producing expanded versions of point matrix characters having a pleasing appearance. The basic character matrix is preferably a grid. The expansion method of the invention requires the determination of a shape code for each point of an unexpanded character matrix, such that any given shape code is derived from the configuration of "blacks" and "whites" in a neighborhood containing the point in question. The shape codes are used as templates for enlarging the original character by chosen expansion factors.

In accordance with one aspect of the invention, the point matrix characters are formed on a grid of constant point density, regardless of character size. The characters may be expanded over a predetermined size range. The characters may also be enlarged by different factors horizontally and vertically. In a preferred embodiment, each expansion factor is a positive integer within a predetermined range.

In accordance with another aspect of the invention, for each member of a character set there is stored a basic A×B array of blacks and whites which defines the character in its lowest magnification. A shape code is assigned to each point on the basis of the configuration of blacks and whites in the neighborhood of that point. Each 3×3 permutation of blacks and whites is assigned a shape code.

In accordance with a further aspect of the invention, the shape code assigned to a given neighborhood reflects considerations of geometry, aesthetics, and cost. The number of shape codes used depends on the user's tradeoff between character quality and cost of implementation. In a particular embodiment characters of attractive appearance are produced using 15 shape codes. The shape codes may be designed in order to provide continuity between adjacent shape codes, and to produce diagonal lines of width equal to that of horizontal and vertical lines. Curved shape codes may be used for aesthetic reasons.

In accordance with yet another aspect of the invention, each shape code is advantageously quantized into an S×S grid of blacks and whites, where S is an integer which is larger than the highest possible expansion character and is relatively prime with respect to all possible expansion factors. In order to expand a character by horizontal expansion factor P and vertical expansion factor Q, for each point in the original matrix a P×Q grid is superimposed on the S×S shape code grid for that point. For each rectangle of the P×Q grid, a black is assigned if the center of that rectangle lies within a black square of the shape code grid, and a white assigned otherwise. This yields a P×Q matrix of blacks and whites for each point of the unexpanded character.

In a preferred embodiment of the invention, the above expansion method may be electronically implemented to expand characters in a matrix printer. The user specifies the character to be expanded and the desired vertical and horizontal expansion factors, which are stored in an input data buffer. The Shape Code Determination block produces the appropriate six bit shape code for each Row, Column location in a basic character matrix which is stored for each member of a character set. For each row, column location in the expanded matrix for a given point of the basic character, a Shape Code Location block determines the corresponding location in the quantized master shape code. Given the master shape code name (from the Shape Code Determination block) and the shape code location index, a Black/White Assignment block produces a black or white for each point in the expanded image. This may be used to drive a matrix printer.

BRIEF DESCRIPTION OF THE DRAWINGS

The above and additional aspects of the invention are explained in the detailed description which follows, taken in conjunction with the drawings in which FIG. 1 is a schematic drawing of a basic character matrix for the character $\phi$.

FIGS. 2a–o illustrate various neighborhoods and assigned shape codes in a particular embodiment of the invention.

FIG. 3a is a schematic view of a region of a basic character matrix.

FIG. 3b is a plan view of a group of shape codes assigned to the region of FIG. 3a.

FIG. 4a is a schematic view of a region of a basic character matrix.

FIG. 4b is a plan view of a group of shape codes assigned to the region of FIG. 4a.

FIGS. 5a–d schematically illustrate various neighborhoods.

FIG. 5e is the shape code assigned to the neighborhoods of FIGS. 5a–d in the embodiment of FIGS. 2a–o.

FIGS. 6a–d show a master shape code and its reflections.

FIG. 7 shows a numerical encoding of the elements of a neighborhood.

FIG. 8 schematically illustrates a quantized shape code.

FIGS. 10a, b show the 5×5 and 2×3 expanded point arrays derived from the quantized shape code of FIG. 8.

FIG. 11 is a tubular diagram of the shape code assignments for the basic character matrix of FIG. 1.

FIGS. 12a–c show three different expansions of the character of FIG. 1.

FIG. 14A shows a 5 by 3 expansion of the character 'R'.

FIG. 14B is a horizontal inversion of the expanded character shown in FIG. 14A.

FIG. 14C is a 90 degree clockwise rotation of the expansion character shown in FIG. 14A.

FIG. 14D is a vertical inversion of the expanded character shown in FIG. 14A.

DETAILED DESCRIPTION

Figure 9A:
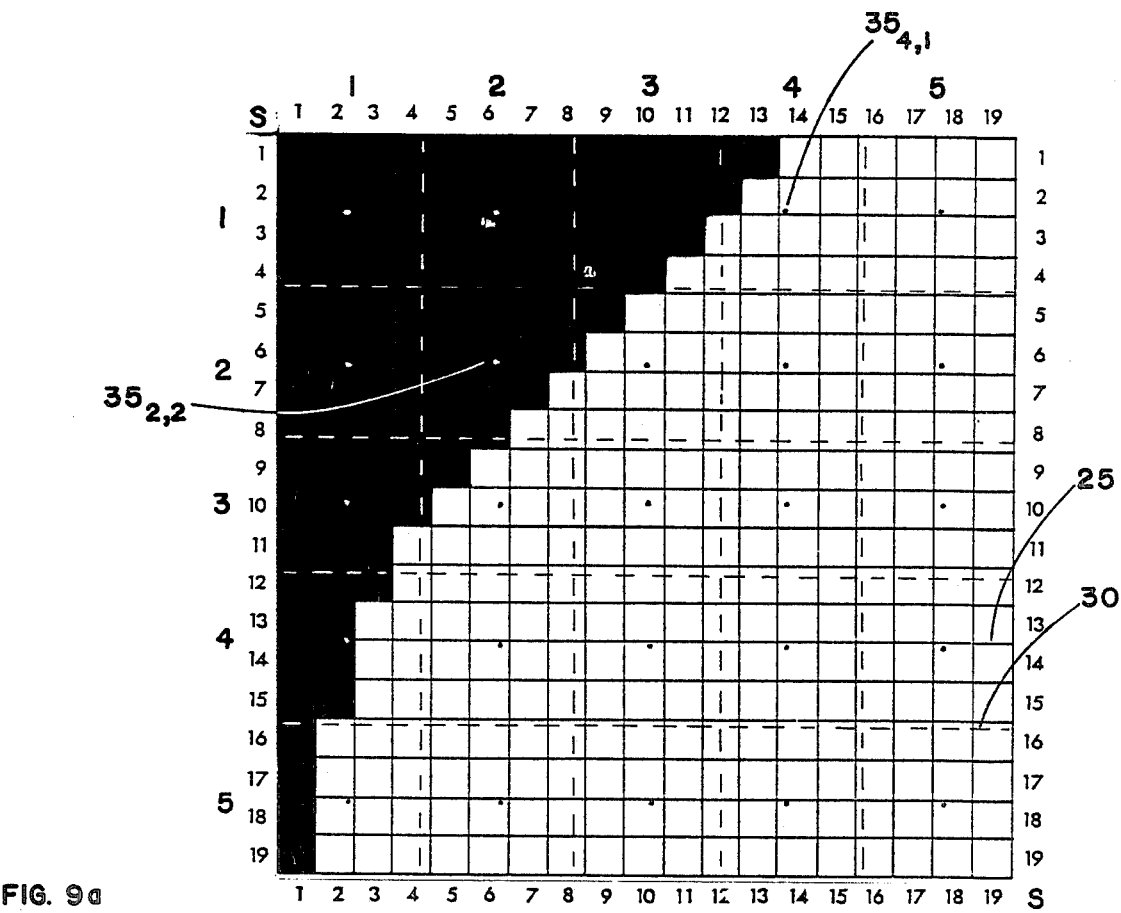
FIGS. 9a, b, show 5×5 and 2×3 expansion matrices superimposed on the quantized shape code of FIG. 8.

Reference should be had to FIGS. 1–13 for a detailed description of the character expansion method and apparatus of the invention.

The present character expansion method involves the storing of a basic character matrix 10 for each member of a character set. FIG. 1 shows a 7×9 basic character matrix 10 for the character $\phi$. The basic character matrices 10 may be of any suitable dimensions. If the user desired a character height range from 0.1 inch to 1.6 inch, with a similar range for character width, the matrix 10 would correspond to the pattern of blacks and whites for the smallest height of 0.1 inch. In this example, which will be adopted for illustrative purposes herein, the point separation of approximately 0.011 inch would be a constant of the system.

In the method of the invention, the user may expand any character of minimal dimensions over a predetermined range of magnifications, advantageously by integral factors. In addition, different expansion factors may be chosen for the horizontal (X) and vertical (Y) dimensions, thus allowing the user to vary the aspect ratio. In the example the user may choose any integral magnification from 1 to 16 for either dimension. If horizontal expansion factor P and vertical expansion factor Q are desired, a single point 15 (whether black or white) in the basic character matrix 10 is replaced with a P×Q array of points. The expanded character is constituted by juxtaposing such P×Q arrays according to th relative positions of their source points in the basic character matrix.

The above process of substituting expanded arrays for single points is accomplished in the invention by means of an algorithm which may be uniformly implemented for every member of the character set. For any given point $15_{A,B}$ of the basic character matrix 10, this algorithm looks to the configuration of blacks and whites in a neighborhood $18_{A,B}$ centering on the point (this is shown at $15_{3,8}$), and assigns appropriate shape code 20 to the point. It has been found that the examination of a 3×3 neighborhood centering on the point in question yields sufficient information to derive a satisfactory shape code. Larger neighborhoods may be used for increased sophistication, but at a considerably higher storage cost, and a 3×3 region is presently assumed.

In its basic embodiment, the shape code 20 is a square filled with continuous areas of black and white, or possibly solid black or white (see FIGS. 2-a through 2-o). a given shape code $20_S$ is assigned to each neighborhood $18_N$, and is always used whenever that particular neighborhood appears in a basic character matrix 10. For a point 15 on the edge of the matrix 10, adjacent points off the edge are assumed to be white. If a 3×3 neighborhood is employed, 512 such assignments are stored. Thus, the algorithmic method of the invention demands considerably less storage than a method which would require the character name and point location as input.

FIGS. 2a through 2o depict an illustrative group of neighborhood-shape code assignments, involving a set of 15 shape codes. The contour of the shape code assigned to the central point of a given neighborhood advantageously reflects several considerations. A shape code should yield a visually pleasing, recognizable character limb when combined with the shape codes assigned to adjacent points of the basic character matrix. One condition which should be met is the minimization of discontinuities between the black/white borders of adjacent shape codes. Curved shape codes may be employed where a bend in a character limb occurs, and in certain other cases. These factors are illustrated by a section of a character matrix as shown in FIG. 3a, as compared with the grouping of assigned shape codes in FIG. 3b. It is also desirable, in the case of diagonal lines, that the shape grouping produce a line with the same width as horizontal and vertical lines in the case of equal horizontal and vertical expansions. Compare FIGS. 4a, 4b. Where the aspect ratio is not one in this method, the horizontal and vertical limbs will have different widths and the width of diagonal lines will be an intermediate value. It is an underlying principle of the invention that one can design shape codes which may be appropriately utilized whenever a given neighborhood appears in any character. In the rare case of a character for which an unusual contour is preferred in a certain neighborhood, the normal algorithm may be modified appropriately.

A survey of the shape codes of FIGS. 2a through 2o reveals that eight are designed for various cases in which the central point is white, and seven for a central black. It may be seen that certain shape codes have straight edges, and others have curved edges. Naturally, the black portions of the first eight shape codes tend to fill less than half the squares, and the converse is true for the last seven. This limited set of shape codes is sufficient to cover all 512 possible neighborhoods, for two reasons. First, there are many neighborhoods which are profitably considered equivalent for the purpose of choosing a shape code for the central square. For example, the neighborhoods of FIGS. 5b, 5c, and 5d may all be considered variations of the neighborhood of FIG. 5a. In each case, the shape code of FIG. 5e is an appropriate substitute for the central square. Secondly, it is possible to limit the number of shape codes which must be stored by recognizing certain shape codes as symmetrical equivalents of a given master shape code. Thus, one may store the shape code of FIG. 6a and derive the shape code of FIG. 6b by reflection about the vertical axis, the shape code of FIG. 6c by reflection about the horizontal axis, and the shape code of FIG. 6d by reflection about both axes.

The above algorithm is easily adaptable to binary information storage devices. Each neighborhood may be represented as a binary number by assigning a different order bit to each square of the 3×3 grid, as shown in FIG. 7. The lowest order bit in this encoding represents the first column, second row, while the highest order bit represents the middle square. A "one" corresponds to a "black". Thus, the neighborhood of FIG. 2a would be stored as 000001110.

The set of shape codes of FIGS. 2a through 2o are advantageously stored as 6-bit bytes. In one embodiment, the four high order bits are used to identify the master shape code (cf. FIGS. 2a through 2o), and the two low order bits identify the basic shape code or a given symmetrical equivalent (cf. FIG. 6a through 6d). Note that the highest order bit is "one" in this embodiment when the point to be expanded is black.

Having derived the shape code 20 for every point of the basic character matrix 10, one may use the set of shape codes to produce an expanded version of the character in question. This is done for each unexpanded point 15 by using a quantized approximation of the shape code for that point. FIG. 8 depicts a 19×19 quantization 25 of the continuous shape code of FIG. 2f. A grid of these dimensions provides a reasonable approximation of the black/white interface in the continuous shape code. It is preferable, for reasons made clear below, that each dimension S of the quantized shape code be a number which is greater than the largest possible factor of expansion (in the example, 16) and is relatively prime with respect to all conceivable (integral) expansions.

In expanding the given character by horizontal factor P and vertical factor Q, each point 15 in the basic character matrix 10 will be replaced by a P×Q array of points. FIG. 9a shows how this is done for a sample quantized shape code 25, that of FIG. 8, in the simple case of P=Q=5. A 5×5 expansion grid 30 is superimposed on the 19×19 shape code matrix 25. Each square of the 5×5 expansion grid corresponds to a point in the expanded version of the point 15 having quantized shape code 25. For any given square (X,Y) of the grid 30, the corresponding point 35 will be black if and only if the center of that square lies on a black square of the 19×19 grid. Thus, the center of square (2, 2) lies in black square (6, 6), while the center of square (3, 4) lies in white square (10, 14).

It can be seen that it is desirable to choose an S which is larger than all possible values of P and Q, in order that the quantized shape code 25 provides sufficiently fine resolution to act as a suitable template in every case. Similarly, the choice of an S which is relatively prime with respect to each P and Q avoids the possibility of the center of one of the P×Q elements falling on the edge of a square in the quantized shape code. Thus, there is no danger of ambiguity.

Figure 9B:
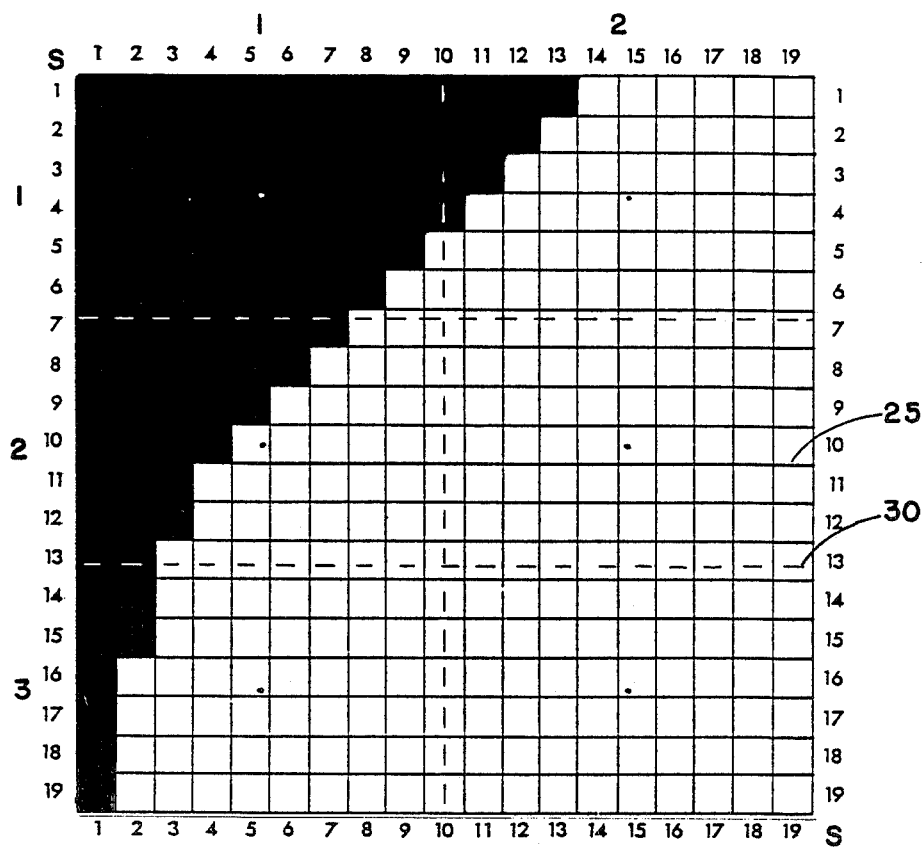

It is simple to extend this technique to the case of P≠Q, as illustrated in FIG. 9b. Here it is desired that the character be doubled in width and tripled in height. Each element of the expansion grid 30 takes the form of a rectangle rather than a square, but otherwise the process of deriving points of the expanded character is identical.

The expanded arrays 35 resulting from the above process are shown in FIGS. 10a, 10b. Each array is substituted for a single point 15 in the basic character matrix 10, producing an expanded version of that point.

The operation of the expansion method of the invention with respect to a given character may be illustrated by its application to the character φ of FIG. 1. For each point (A, B), a neighborhood 18 for that point is examined and assigned a shape code 20 on the basis of the stored assignments. This results in a 7×9 array 40 of 6-bit shape code assignments, as shown in FIG. 11. In each shape code, the four high order bits designate the master shape (shown in FIGS. 2a–o ) and the two low order bits give the orientation of the master shape, in the code of FIGS. 6a–d.

Shape code array 40 provides the basis for expanding the basic character matrix 10 by chosen horizontal expansion factor P and vertical expansion factor Q. For each shape code, the corresponding 19×19 quantized shape code 25 is produced (see FIG. 8). As illustrated in FIGS. 9a, b and 10a, b, a P×Q array 35 of blacks and whites is derived from quantized shape code 25. These expanded arrays 35 are combined in their appropriate positional relationship to produce the expanded character 45.

Figure 12A:
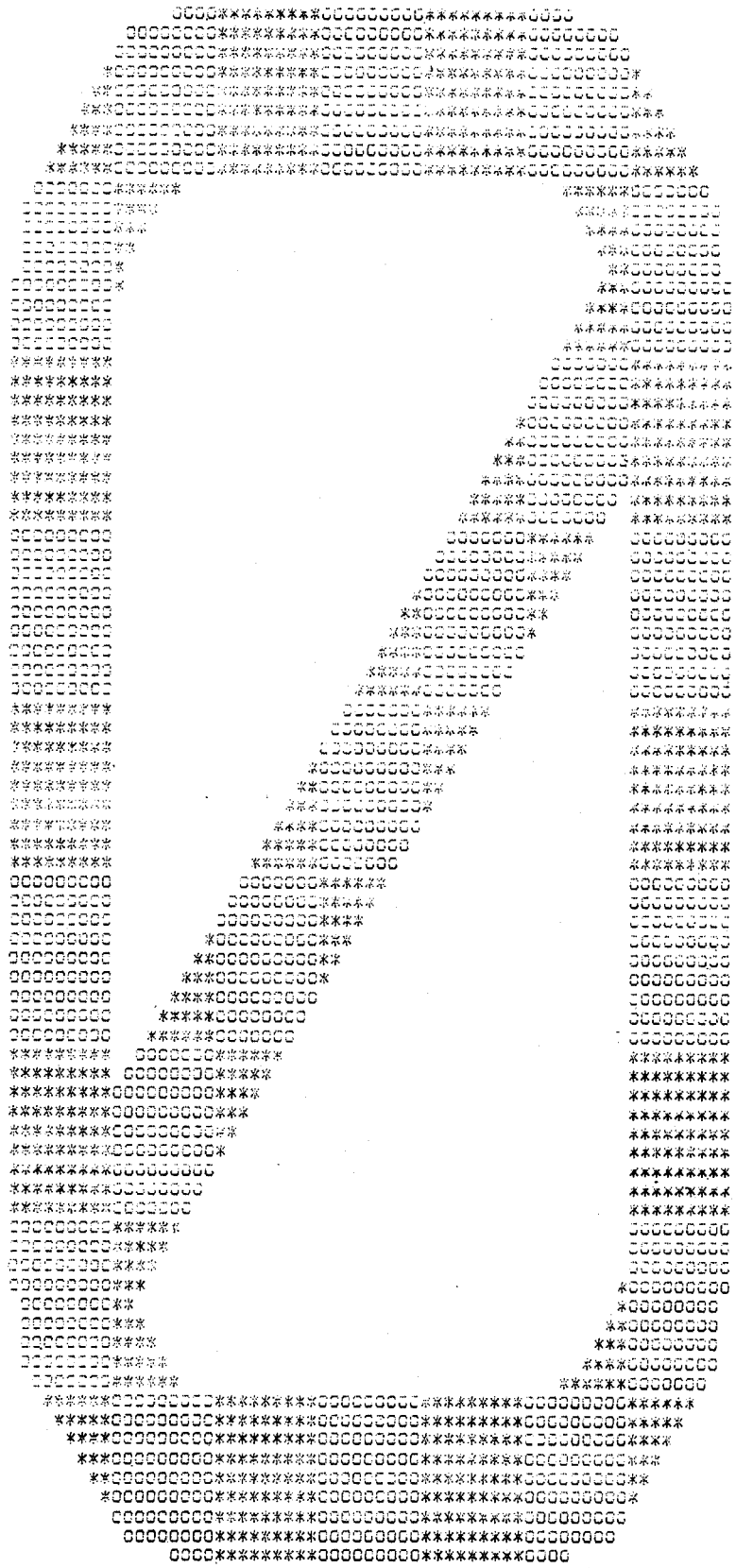
Figure 12B:
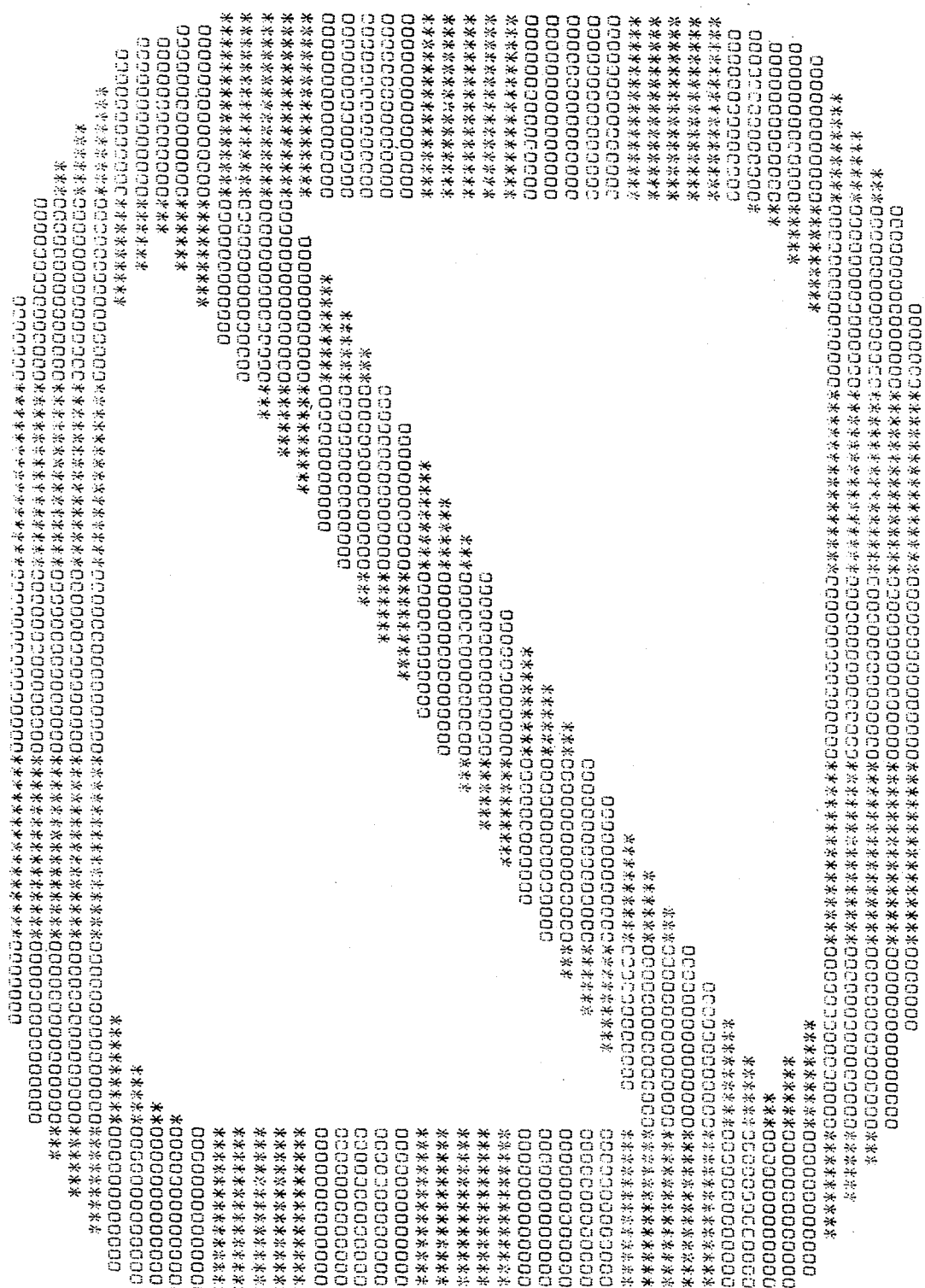
Figure 12C:
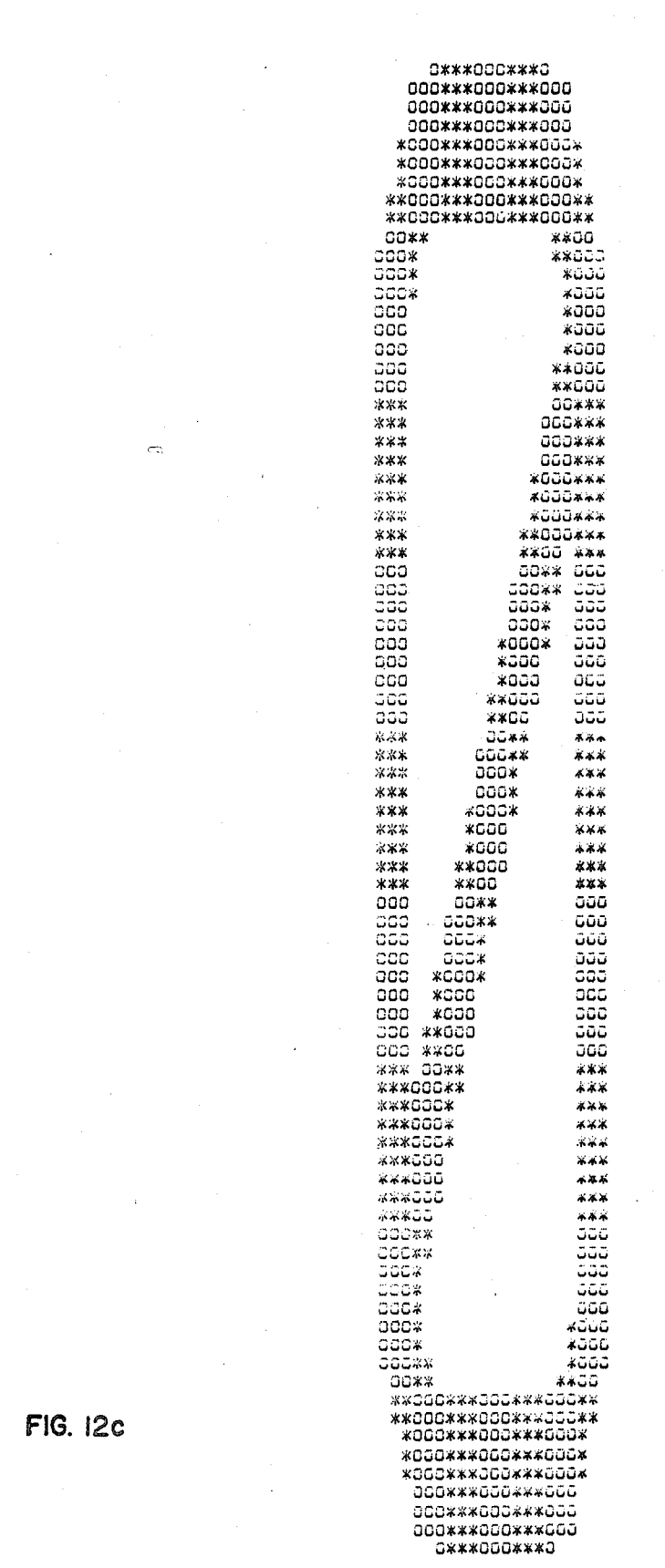

Several illustrative expansions of the character of FIG. 1 appear in FIGS. 12a–c. FIG. 12a shows the case of equal factors of expansion in the horizontal and vertical direction, the factor being 9. This expansion is large enough to show the shape codes with reasonable resolution. FIG. 12b is an example of a horizontal expansion which is significantly larger than the vertical expansion (P=15, Q=5). FIG. 12c gives the contrasting case of a larger vertical expansion (P=3, Q=9).

Figure 13:
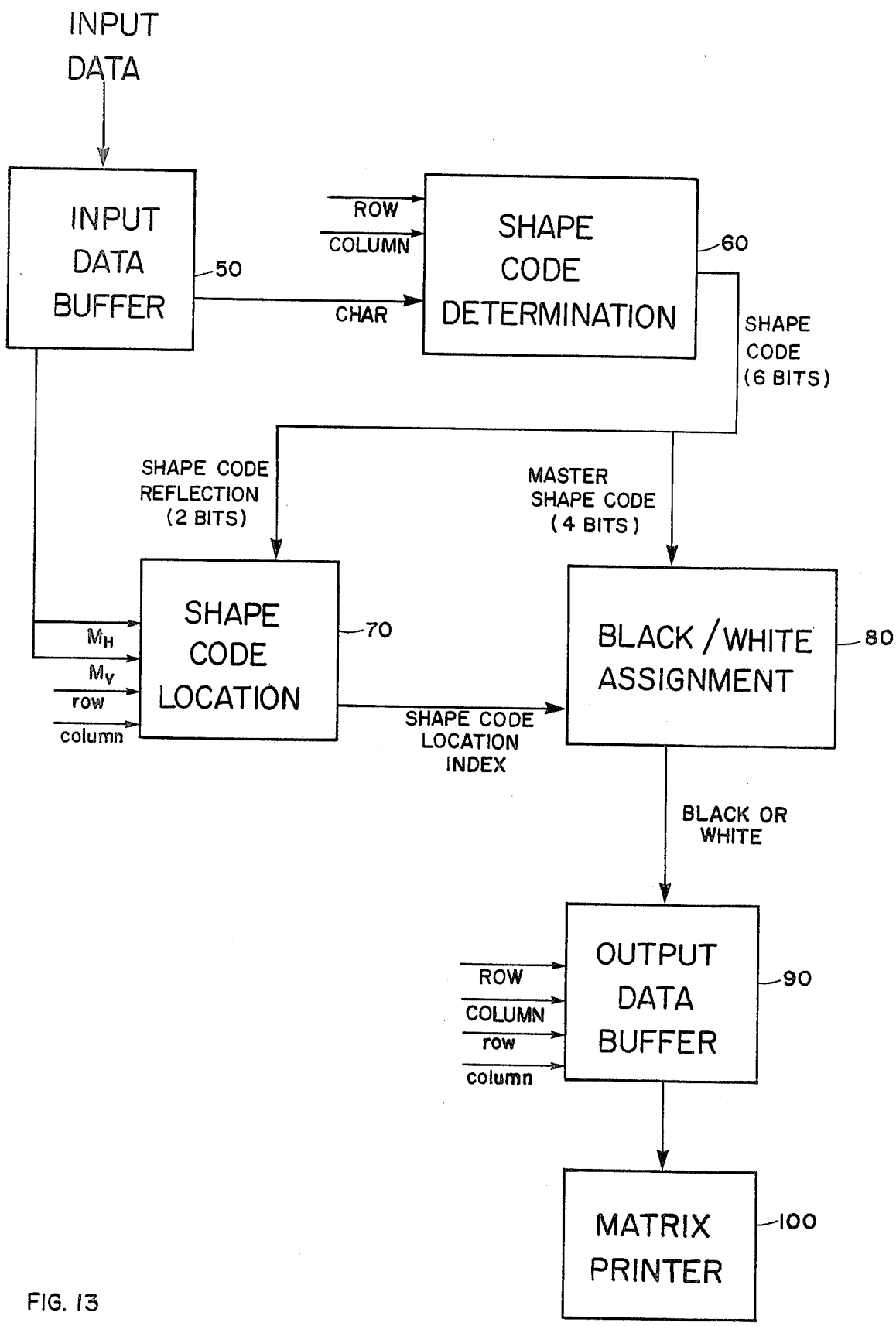
FIG. 13 is a functional block diagram of expansion apparatus in accordance with a preferred embodiment of the invention.

With reference to FIG. 13, there is shown a functional block diagram of character expansion apparatus for use in matrix character printing according to a preferred embodiment of the invention. The user provides as input data the character name and the desired horizontal and vertical magnifications. These are stored in an Input Data Buffer 50, which may advantageously comprise a random access memory.

The first stage of the expansion method is implemented by Shape Code Determination block 60. This takes as input data character name CHAR which is illustratively a 7-bit byte. SCD 60 also receives sequentially a 4-bit ROW index and a 3-bit COLUMN index. These are used to identify the point to be expanded in the basic character matrix, and are incremented periodically.

SCD 60 contains two diffeent types of Read Only Memory (ROMs). The Character ROMs contain the black/white values for every Row, Column location in every basic character matrix. The Shape ROMs contain the shape code assignments for all possible 3×3 neighborhoods. After determining the values of the eight neighboring points by means of the Character ROMs, SCD 60 produces a 6-bit shape code using the Shape ROMs. Circuitry to effect this stage will be apparent to those skilled in the art.

Shape Code Location block 70 receives as input the two low order (reflection) bits of the shape code output of SCD 60. SCL 70 also receives values from input buffer 50 indicating the horizontal and vertical magnifications. $M_H = P-1$, and $M_V = Q-1$, so $M_H = 2$ indicates a character of tripled width. $M_H$ and $M_V$ are illustratively 4-bit numbers. Additionally, SCL 70 is fed values of row and column—$R_J$ and $C_J$—which satisfy $0 \leq R_J \leq M_V$ and $0 \leq C_J \leq M_H$. $R_J$ and $C_J$ indicate the location of a point within expanded matrix 35, and are incremented periodically to assume all integral values from 0 to $M_V$ and $M_H$, respectively. These various inputs are used to determine the corresponding point location ($R_K$, $C_K$) within the quantized master shape code 25 by means of a Ratio ROM, which carries out the assignment process illustrated in FIGS. 9a, b. $R_K$ and $C_K$ are illustratively integers between 0 and 18 inclusive. Depending on the value of the reflection bits, the Ratio ROM may make one of two assignments. For example, if the ratio ROM would assign $R_K$ to a given $R_J$ for reflection bits 00, it should assign $R_K$ for reflection bits 01, and $18-R_K$ for reflection bits 10 or 11. The resulting ($R_K$, $C_K$) assignment illustratively comprises two five bit bytes, which may be economically combined in a unique nine bit location index (for a 19×19 quantized shape code).

Black/white Assignment block 80 is sent the four bit master shape code name from SCD 60 (the four high order shape code bits), and the shape code location index from SCL 70. A Quantized Shape ROM looks up the black/white assignment in the quantized master shape code for the given shape code location, and outputs a black or white for the corresponding row, column location in the expanded matrix.

This process is repeated sequentially for all possible values of Row, Column and row, column until the entire expanded character is constituted. The resulting black/white data is stored in output data buffer 90, and may be used, for example, to activate a matrix printer 100.

Figures 14A, 14B:
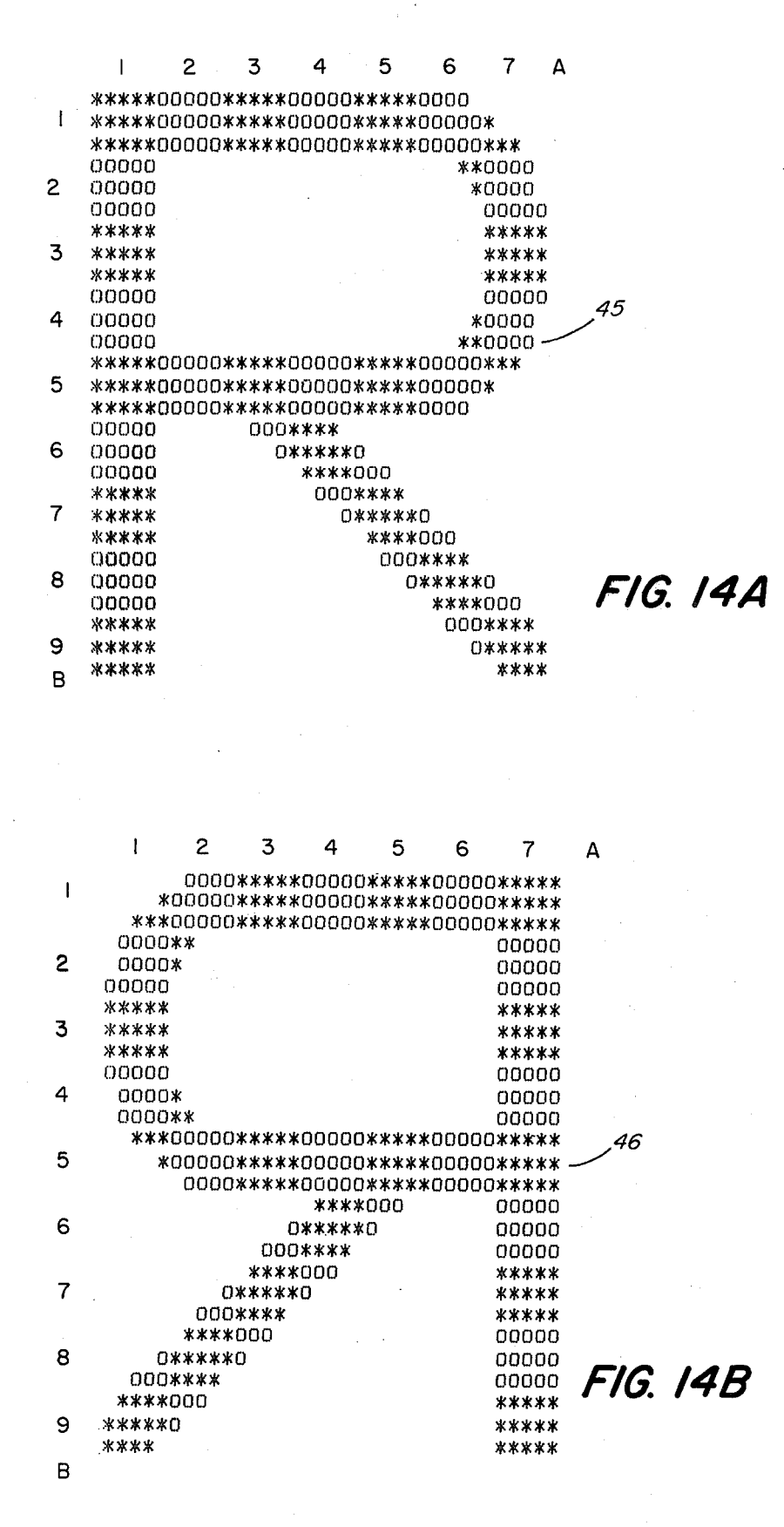

Because of the point-by-point nature of the expansion and reconstruction of the character, it is a fairly simple matter to modify the above method and apparatus to allow additional transformations of the basic character in forming the finally printed character. To invert the expanded character around the horizontal axis, it is necessary to replace each value of row with $M_V + 1 -$row in each expanded point array, and to replace each value of Row with $B + 1 -$Row in the expanded character matrix. For an inversion around the vertical axis, the substitutions are $M_H + 1 -$column for column and $A + 1 -$Column for Column. FIG. 14A is a 5×3 (horizontal by vertical) expansion 45 of the letter 'R' in accordance with the invention. For this expanded character, $A = 7$, $B = 9$, $M_H = 5$, and $M_V = 3$. FIG. 14B shows an inversion 46 around the vertical axis of expanded point array 45. In the inversion 46, each element $15_{Column, Row}$ of array 45 has been replaced by element $15_{A+1-Column, Row}$. For example, element $15_{3, 6}$ has been replaced by element $15_{5, 6}$. Within each element 15, the points of the 5×5 expansion arrays 35 have been similarly inverted ($35_{M_H+1-column, row}$ is substituted for $35_{column, row}$). In element $15_{7, 9}$, which is element $15_{1, 9}$ in the inverted character, point $35_{1, 1}$ (a black) has been replaced by element $35_{5, 1}$ (a white).

Figures 14C, 14D:
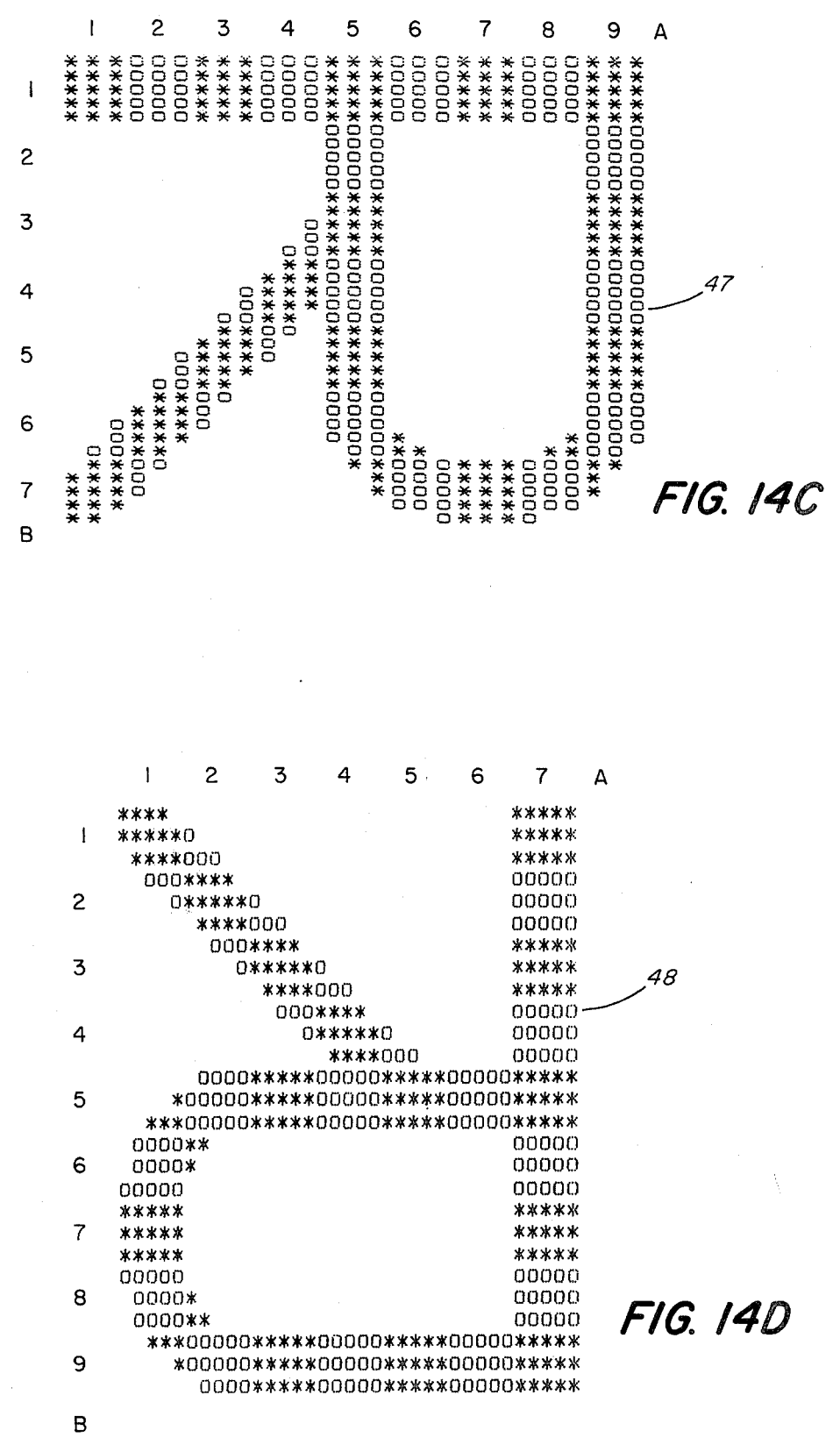

FIG. 14C shows a 90° clockwise rotation 47 of the expanded character 45 of FIG. 14A. In rotated character 47, the dimensions, A, B are reversed, and expansion factors $M_H$, $M_V$ within each element of the character are similarly reversed. Each element $15_{Column, Row}$ is replaced by element $15_{B+1-Row, Column}$. For example, element $15_{9, 7}$ of rotated character 47 corresponds to element $15_{7, 1}$ of character 45. Within the expanded point array 35, each point $35_{column, row}$ is replaced by point $35_{M_V+1-row, column}$. Thus, for example, in element $15_{9, 7}$ of the rotated character 47, the point $35_{1, 3}$ (a black) is derived from the point $35_{3, 3}$ of the corresponding element $15_{7, 1}$ of expanded character 45.

FIG. 14D gives a 180° rotation 48 of the expanded character 45 of FIG. 14A. Each element $15_{Column, Row}$ is replaced by element $15_{A+1-Column, B+1-Row}$, and within the expanded point arrays 35 each point $35_{column, row}$ is replaced by point $35_{M_H+1-column, M_V+1-row}$.

Additional circuitry to effect the above transformations will be apparent to those skilled in the art.

While various aspects of the invention have been set forth by the drawings and the specification, it is be understood that the foregoing detailed description is for illustration only and that various changes in parts, as well as the substitution of equivalent constituents for those shown and described, may be made without departing from the spirit and scope of the invention as set forth in the appended claims.

I claim:

1. A method for producing expanded versions of matrix defined characters of constant point density comprising the steps of:
   a. defining each character through a basic character matrix wherein each element consists of either "black" or "white";
   b. assigning a shape and corresponding code to each element of the basic character matrix on the basis of a predetermined identification of said shape with the pattern of blacks and whites in a neighborhood of the basic character matrix centering on said element;

c. producing a quantized representation of said shape in response to said code, having a matrix pattern of black and white elements;

d. coordinating said quantized representation with an expansion matrix subdivided in accordance with desired horizontal and vertical expansion factors;

e. forming an expanded point array with elements matching the subdivisions of said expansion matrix such that each element of the expanded point array is assigned a black if and only if the center of the corresponding expansion matrix subdivision coincides with a black element of said quantized representation; and f. combining the expanded point arrays in a matrix defined by the ordering of elements of said basic character matrix.

2. The method of claim 1 wherein said neighborhood comprises a 3×3 region of basic character matrix elements centering on the element to be assigned to a shape.

3. The method of claim 1, wherein the quantized representation of said shape contains a number of subdivisions in each dimension which is greater than and relatively prime with respect to any desired horizontal and vertical expansion factors.

4. The method of claim 1 for use in character expansion logic apparatus wherein a. the defining step comprises creating a binary array with the "one" state representing black and the "zero" state representing white, b. the assigning step comprises identifying an ordered set of binary states of the neighborhood elements with a binary shape code indexed to said ordered set, c. the producing step comprises accessing a two-dimensional binary array corresponding to the contour of said shape and indexed to said binary shape code, d. the coordinating step comprises generating a quantized shape location index corresponding to the center of said expansion matrix subdivision, e. the forming step comprises tabulating an expanded point binary array such that for each element of the expanded point binary array a "one" is assigned to that element if and only if its quantized shape location index keys to a "one" in the two-dimensional binary array of step c, and f. the combining step comprises forming an expanded character binary array by combining said binary expanded point arrays as elements in the binary array of step a.

5. The method of claim 4 for use in matrix printing wherein binary values in said expansion logic apparatus represent print signals, further comprising the steps of converting the print signals in said expanded character array to a format which is compatible with the printing format of a matrix printer, and applying the converted binary printing signals to said matrix printer.

6. The method of claim 5 further comprising the step of placing the converted printing signal in an output buffer before applying them to the matrix printer.

7. The method of claim 4 wherein said binary shape code is divided into "master" bits and "reflection" bits, the two-dimensional binary array of step 5c comprises a master shape code array, and step 5d further comprises modifying said quantized shape code location index where dictated by said reflection bits.

8. The method of claim 4 further comprising the steps of inverting the configuration of elements in said expanded point binary array around an axis and inverting the configuration of expanded point binary arrays in said expanded character binary array around the same axis to effect an inversion of the expanded matrix defined character around said axis.

9. The method of claim 4 further comprising the steps of rotating the configuration of elements in said expanded point binary array through an orthogonal angle and rotating the configuration of expanded point binary arrays in said expanded character binary array through the same orthogonal angle to effect a rotation of the expanded matrix defined character through said orthogonal angle.

10. Apparatus for expanding matrix characters of constant point density comprising a. means for generating a binary shape code for each element of a basic character matrix comprising
  (1) basic character matrix storage means for representing matrix characters, wherein binary "1" represents a black element and binary "0" represents a white element;
  (2) neighborhood-shape code storage means, for assigning binary shape codes to basic character elements at the center of a set of matrix character neighborhoods;
  (3) means responsive to a character identification signal to produce a binary shape code signal for each element of the basic character matrix indexed to said character identification signal, by reference to said neighborhood-shape code storage means;

b. means for generating an expanded point array for each element of said basic character matrix comprising
  (1) quantized shape storage means, for assigning to said binary shape code a two-dimensional binary array representing the contour of a desired shape;
  (2) means responsive to signals indicative of horizontal and vertical expansion factors for assigning to each point within said expanded point array a quantized shape location index corresponding to the center of an expansion matrix subdivision, wherein said expansion matrix is subdivided in accordance with said horizontal and vertical expansion factors,
  (3) means responsive to said quantized shape location index to produce by reference to said two-dimensional binary array a "1" for a given element of said expanded point array if and only if a "1" is contained in the two-dimensional binary array at the appropriate quantized shape location; and c. expanded character storage means for combining the expanded point arrays in accordance with the ordering of elements of said basic character matrix to create an array of binary signals representative of the expanded character.

11. Apparatus as defined in claim 10 wherein said neighborhood comprises a 3×3 region of basic character matrix elements centering on the element to be assigned a binary shape code.

12. Apparatus as defined in claim 10 for point matrix printing wherein the binary values in said apparatus comprise binary print signals, such apparatus further comprising means for converting the binary print signals in said expanded character storage means into a signal format which is compatible with the printing format of a matrix printer.

13. Apparatus as defined in claim 12 further comprising a matrix printer to which said converted print signals are applied.

14. Apparatus as defined in claim 10 further comprising input storage means for receiving the character identification signals and the signals indicative of horizontal and vertical expansion factors.

15. Apparatus as defined in claim 10 wherein said basic character matrix storage means, said neighborhood shape code storage means, and said means for assigning a quantized shape location index to each point within said expanded point array comprise read only memories.

16. Apparatus as defined in claim 10 wherein said binary shape code signal comprises "reflection" bits and "master" bits.

17. Apparatus as defined in claim 16 wherein the means for assigning a quantized shape location index to each point within said expanded point array further comprises means for asigning a modified quantized shape location index where dictated by said reflection bits, and wherein said quantized shape code storage means assigns to the "master" bits of said binary shape code a two-dimensional binary array corresponding to the contour of a master shape code.

18. Apparatus as defined in claim 10 further comprising means for buffering the binary signals representative of the expanded character in said expanded character storage means.

19. Apparatus as defined in claim 10 further comprising a character inversion means for inverting the configuration of elements in said expanded point arrays around an axis and for inverting the configuration of expanded point arrays in said expanded character storage means around the same axis to effect an inversion of the expanded character around said axis.

20. Apparatus as defined in claim 10 further comprising a character rotation means for rotating the configuraton of elements in said expanded point arrays through an orthogonal angle and for rotating the configuration of expanded point arrays in said expanded character storage means through the same orthogonal angle to effect a rotation of the expanded character through said orthogonal angle.

* * * * *